United States Patent
Tso et al.

(10) Patent No.: US 6,247,050 B1
(45) Date of Patent: Jun. 12, 2001

(54) SYSTEM FOR COLLECTING AND DISPLAYING PERFORMANCE IMPROVEMENT INFORMATION FOR A COMPUTER

(75) Inventors: Michael Man-Hak Tso, Hillsboro; Bikram Singh Bakshi; Robert Conrad Knauerhase, both of Portland, all of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/928,645

(22) Filed: Sep. 12, 1997

(51) Int. Cl.[7] ............................ G06F 15/173; G06F 15/16
(52) U.S. Cl. ............................ 709/224; 709/246; 709/203
(58) Field of Search ...................................... 709/224, 247, 709/246, 203; 340/825.06, 825.08, 825.17; 370/252, 521

(56) References Cited

U.S. PATENT DOCUMENTS

| | | | |
|---|---|---|---|
| 5,042,027 | * 8/1991 | Takase et al. | 370/252 |
| 5,373,375 | 12/1994 | Weldy | 358/523 |
| 5,517,612 | 5/1996 | Dwin et al. | 395/166 |
| 5,544,320 | 8/1996 | Konrad | 395/200.09 |
| 5,623,598 | * 4/1997 | Voigt et al. | 714/47 |
| 5,673,322 | 9/1997 | Pepe et al. | 380/49 |
| 5,684,969 | 11/1997 | Ishida | 395/342 |
| 5,701,451 | 12/1997 | Rogers et al. | 395/600 |
| 5,706,434 | 1/1998 | Kremen et al. | 395/200.09 |
| 5,724,556 | 3/1998 | Souder et al. | 395/500 |
| 5,727,159 | 3/1998 | Kikinis | 395/200.76 |
| 5,742,905 | 4/1998 | Pepe et al. | 455/461 |
| 5,768,510 | 6/1998 | Gish | 395/200.33 |
| 5,774,668 | * 6/1998 | Choquier et al. | 709/223 |
| 5,787,253 | * 7/1998 | McCreery | 709/231 |
| 5,796,633 | * 8/1998 | Burgess et al. | 702/187 |
| 5,805,735 | 9/1998 | Chen et al. | 382/239 |
| 5,850,386 | * 12/1998 | Anderson et al. | 370/241 |
| 5,867,483 | * 2/1999 | Ennis, Jr. et al. | 370/252 |
| 5,886,643 | * 3/1999 | Diebboll et al. | 340/825.08 |
| 5,905,868 | * 5/1999 | Baghai et al. | 709/224 |
| 5,913,036 | * 6/1999 | Brownmiller et al. | 709/224 |
| 5,925,106 | * 7/1999 | Nielsen | 709/247 |
| 5,961,596 | * 10/1999 | Takubo et al. | 709/224 |
| 6,003,079 | * 12/1999 | Friedrich et al. | 709/224 |
| 6,006,260 | * 12/1999 | Barrick et al. | 709/224 |

OTHER PUBLICATIONS

Armando Fox and Eric A. Brewer, "Reducing WWW Latency and Bandwidth Requirements by Real–Time Distillation," Fifth International World Wide Web Conference, May 6–10, 1996.

Armando Fox et al., Adapting to Network and Client Variability via On–Demand Dynamic Distillation, University of Cal. at Berkeley, Sep. 1996.

* cited by examiner

Primary Examiner—Zarni Maung
Assistant Examiner—Jason D. Cardone
(74) Attorney, Agent, or Firm—Kenyon & Kenyon

(57) ABSTRACT

A system for collecting and displaying performance improvement information for a computer is implemented in a method for providing performance improvement information to a client device. The method includes the steps of receiving a request from the client device for network content, retrieving the requested network content, and transmitting the network content to the client computer with information relating to a performance improvement associated with the retrieval and/or transmission of the network content.

20 Claims, 7 Drawing Sheets

SYSTEM FOR COLLECTING AND DISPLAYING PERFORMANCE IMPROVEMENT INFORMATION FOR A COMPUTER

BACKGROUND OF THE INVENTION

1. Field of the Invention

The present invention relates generally to the field of data communications for personal computers, and in particular to a system for dynamically collecting and displaying performance improvement information.

2. Related Art

The Internet is quickly becoming the preferred data communications medium for a broad class of computer users ranging from private individuals to large multinational corporations. Such users now routinely employ the Internet to access information, distribute information, correspond electronically, and even conduct personal conferencing. An ever-growing number of individuals, organizations and businesses have established a presence on the Internet through "Web pages" on the World-Wide Web (WWW).

At the same time that the Internet's popularity has been growing, the trend in personal computer (PC) design has been towards increased portability. This trend is best evidenced by the rapid growth in popularity of so-called "notebook" or "laptop" computers. Unfortunately, while PCs are becoming both more powerful and more portable, advances in communications infrastructure have not necessarily kept pace.

A primary limitation on the ability of personal computers to exploit the Internet to full benefit is a lack of sufficient communications bandwidth. Similar problems may be caused by such conditions as high network traffic, even for high-speed Internet access lines. Outside of an office environment, for example, PCs typically connect to the Internet via POTS (Plain Old Telephone Service) or wireless modems at speeds ranging from 9.6 to 14.4 kbps. Such speeds are substantially lower than typical office LAN (Local Area Network) bandwidths. This limited data communications capability can translate into long user-visible latencies when interacting with the Internet.

A number of approaches have been (and are being) developed to address the problem of slow data communications in the context of Internet applications. One such approach involves using one or more intermediate devices, such as a "network proxy," arranged between a client device and content servers on the Internet to enhance client/network data communications. Network proxies may be used, for example, to cache network content so that subsequent client requests may be satisfied without having to re-retrieve a requested data object from a content server. Network proxies may also be used to "transcode" data objects into a form that may be downloaded more quickly. Such transcoding might comprise, for example, techniques such as data compression and image quality reduction which tend to reduce the amount of data to be downloaded.

As techniques for improving the performance of client/network data communications are being developed, it is desirable to be able to quantify the performance benefits derived from those techniques and to communicate such information to users. There is therefore a need for methods and apparatus to collect and display performance improvement information for a client device, including when performance improvement benefits are provided to a client device in a distributed manner by a plurality of other devices.

SUMMARY OF THE INVENTION

The present invention relates to methods and apparatus for collecting and displaying performance improvement information. Embodiments of the present invention have particular applicability to an environment in which a client device retrieves content from a network, such as the Internet. Such embodiments may be applied, for example, to quantify and display on a client device performance improvement benefits attributable to an intermediate device through which the client device accesses network content.

According to one embodiment of the present invention, a method for providing performance improvement information to a client device includes the steps of receiving a request from the client device for network content; retrieving the requested network content; and transmitting the network content to the client computer with information relating to a performance improvement associated with the retrieval and/or transmission of the network content.

DETAILED DESCRIPTION

The present invention relates to a system for collecting and displaying performance improvement information for a computer. Embodiments of the present invention may be applied, for example, to provide a user of a network client device with a visual display of performance improvements attributable to the activities of an intermediate device, such as a network proxy or a network server, through which the client device accesses network resources. Such embodiments may be particularly advantageous for use with devices configured to improve the performance of bandwidth-constrained computers when accessing content on the Internet.

Figure 1:
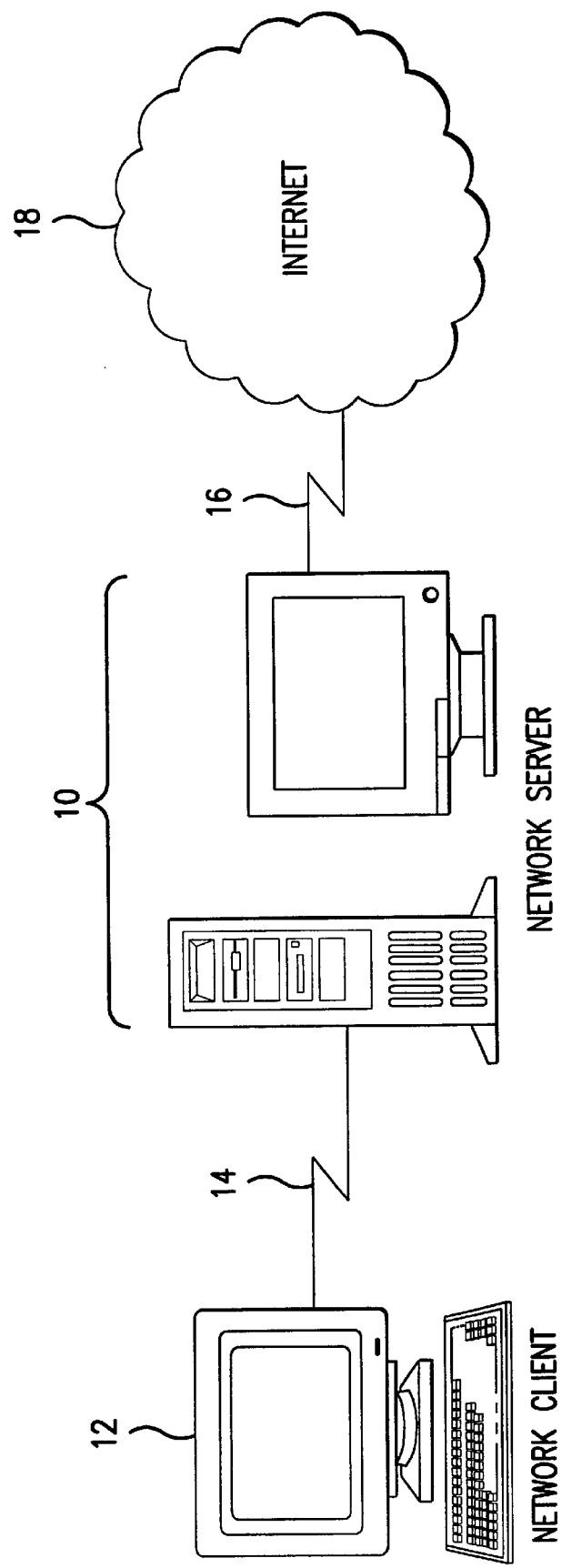
FIG. 1 is a schematic diagram illustrating an environment in which embodiments of the present invention may be applied.

FIG. 1 illustrates an environment in which embodiments of the present invention may be advantageously applied. In this environment, a network server 10 manages the transfer of data from the Internet 18 to a network client 12. Network client 12, which may be any computer having suitable data communications capability, communicates requests for information to, and receives information from, network server 10 over a client/server communications link 14.

Client/server communications link 14 may comprise, for example, a so-called "slow network" using, for example, POTS dial-up technology or wireless connections. Alternatively, client/server communications link 14 may comprise a so-called "fast network," such as a LAN or WAN (Wide Area Network), which is capable of operating at much higher speeds. Combinations of these access methods are also common. For example, network client 12 may use a POTS or wireless dial-up connection to a modem bank maintained by an ISP (Internet Service Provider), which is in turn connected to network server 10 over a LAN. Network server 10 communicates with computers resident on Internet 18 through server/network communications link 16, which may comprise any suitable communications medium known in the art.

A variety of solutions exist and/or are being developed for providing bandwidth-constrained computer users with faster access to the full range of rich data content available on the Internet. Such solutions are typically directed to reducing the gap between the richness of available content and the ability of bandwidth-constrained PCs to provide users with access to that content. One such solution is to use a specially-configured device, such as a network proxy, to serve as an intermediary for communications between a client device and the Internet. A network proxy may be used, for example, to cache network content so that subsequent client requests may be satisfied without having to re-retrieve a requested data object from a network content server. Network proxies may also be used to "transcode" data objects into a form that may be downloaded more quickly. Such transcoding might comprise, for example, techniques such as data compression and image quality reduction which tend to reduce the amount of data downloaded to a client device.

Figure 2:
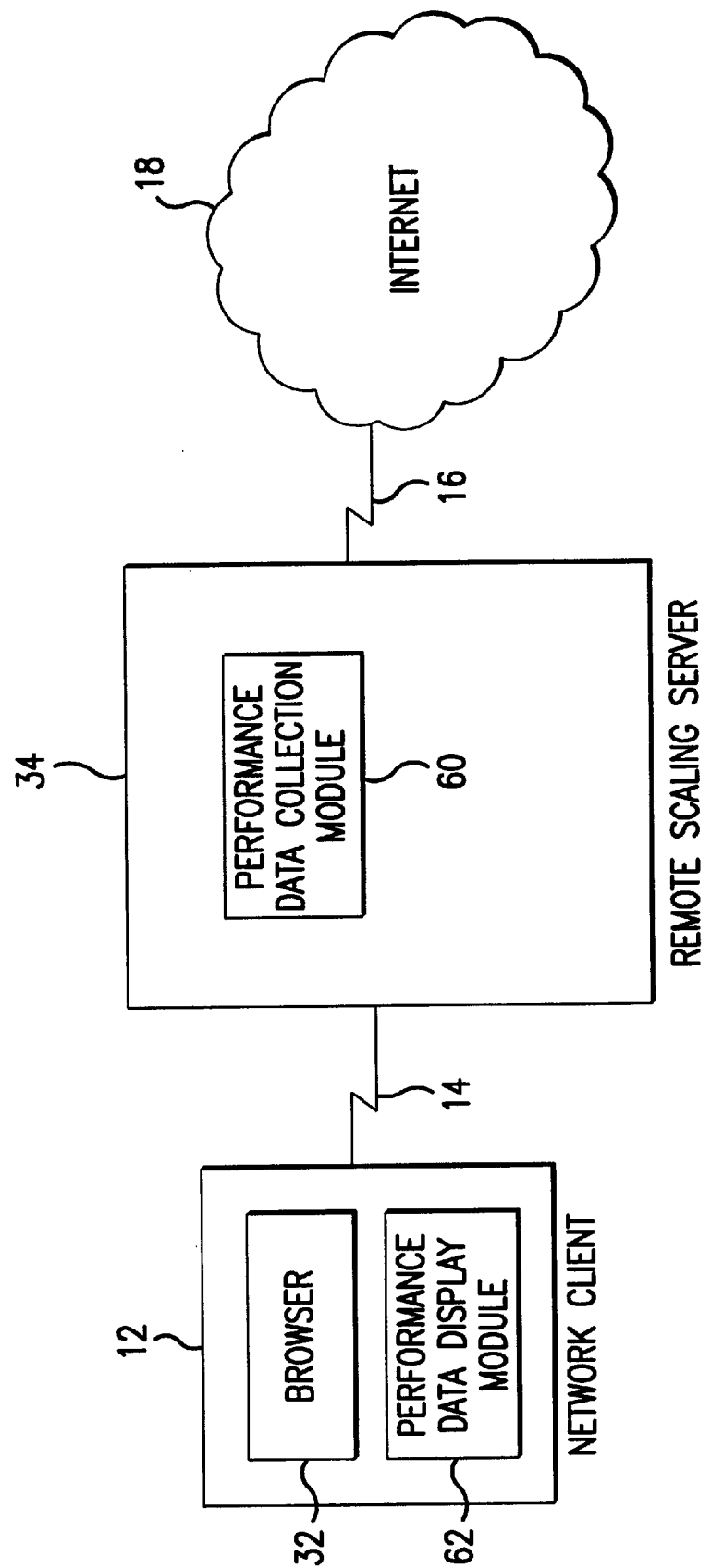
FIG. 2 is a schematic diagram illustrating a system for collecting and displaying performance improvement information according to an embodiment of the present invention.

FIG. 2 illustrates an embodiment of the present invention directed to an environment in which network client 12 accesses content on Internet 18 through a remote scaling server 34. According to this embodiment, remote scaling server 34 includes a performance data collection module 60 comprising, for example, executable instructions for gathering data which may be used to quantify improvements in data communications performance for interactions between remote scaling server 34 and Internet 18. In addition, network client 12 includes a performance data display module 62 configured to render dynamic performance improvement information to the user of network client 12, providing the user with an indication of the data communications performance improvements attributable to remote scaling server 34. Much of the functionality of performance data collection module 60 and performance data display module 62 may be provided by, or be integrated with, facilities used to provide performance improvements to network client 12. Accordingly, a description of exemplary facilities follows.

Figure 3:
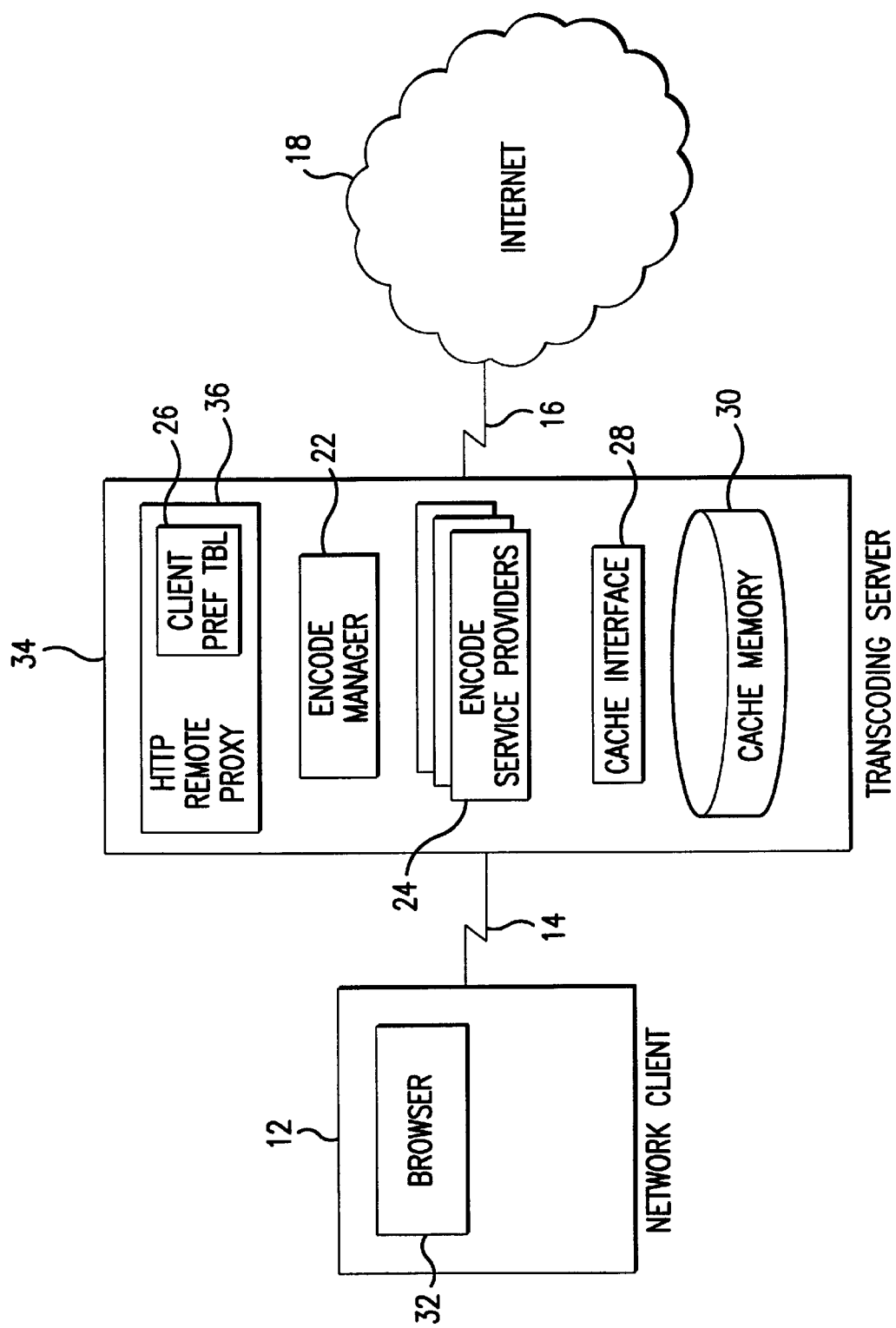
FIG. 3 is a schematic diagram illustrating a remote scaling server of a type to which embodiments of the present invention may be applied.

Referring now to FIG. 3, in order to provide network client 12 with improved performance when retrieving content from Internet 18, network client 12 may be configured to direct all requests for network content to, and receive all responses to such requests from, remote scaling server 34. Remote scaling server 34 may comprise, or be a part of, a network server (such as that illustrated in FIG. 1), a standalone computer in communication with a network server, or even a distributed system of computers (see FIG. 5 and the associated description). Remote scaling server 34 may be coupled, for example, to an ISP's network, a corporate network, or anywhere on Internet 18, and may provide multiple users (clients) with access to content on Internet 18.

In this particular arrangement, remote scaling server 34 includes an HTTP (Hypertext Transfer Protocol) remote proxy 36 capable of accessing Internet 18 over server/network communications link 16. HTTP remote proxy 36 differs from standard network proxies, which generally are little more than a conduit for requests to, and replies from, external Internet resources, in that it is capable not only of examining such requests and replies, but also of acting upon commands in the requests by, for example, determining whether or not to scale or otherwise transcode (add, modify, delete) content before downloading it to network client 12.

An encode manager 22 is coupled to HTTP remote proxy 36. Encode manager 22 manages the transcoding of data to be transmitted from remote scaling server 34 to network client 12. To this end, encode manager 22 controls one or more encode service providers 24 which may be used to selectively transcode content based on a predetermined selection criterion, such as a characteristic of the content itself. For example, each encode service provider 24 may provide the capability to compress and/or scale a different type of data content, such as image, video, or HTML (Hypertext Markup Language). Other examples of such predetermined selection criteria include presentation capabilities of network client 12, such as an ability to playback sound recordings, a quality of sound supported (e.g., mono versus stereo), and resolution, dimensions and/or color support of a user display device; CPU and/or memory capacity; speed and/or quality of client/server communications link 14; and/or user-selected preferences.

As shown in FIG. 3, remote scaling server 34 also includes a server-side cache memory 30 managed by a server-side cache interface 28. Server-side cache memory 30 may be used to store both original and transcoded versions of content for later transmission to network client 12 without the need to re-retrieve the content from Internet 18 or to re-transcode the content. Network client 12 includes a browser 32, such as the Netscape Navigator v.3.0 browser, which manages the presentation of data to a user. In this particular arrangement, network client 12 is "non-enabled," meaning no specialized software is preloaded on the device to facilitate the transcoding functionality.

Encode manager 22 may comprise, for example, a relatively simple, uniform interface to HTTP remote proxy 36, and may provide an API (Application Programming Interface) for encoding data received by HTTP remote proxy 36. Likewise, encode manager 22 may access encode service providers 24 through a common SPI (Service Provider Interface). In this particular configuration, encode manager 22 is designed in compliance with the Windows Open Systems Architecture (WOSA), and may be implemented as a Win32 DLL (Dynamic Link Library). The WOSA architecture, described in *Readings on Microsoft Windows and WOSA* (Microsoft Corp. 1995), enables additional encode service providers 24 to be dynamically added to the system to provide new features, such as new or improved scaling algorithms, while at the same time not requiring changing or retesting other software components in the system. This feature is especially beneficial where remote scaling server 34 also interacts with "enabled" network clients loaded with specialized decoding software (described below). Remote scaling server 34 may advantageously be configured flexibly enough to process requests from both non-enabled and enabled network clients.

Like encode manager 22, server-side cache interface 28 may be modeled after a Get/Set interface. Server-side cache memory 30 essentially "owns" all cached objects, in that it manages the properties and storage of the objects and may invalidate any non-locked object at any time; however, the actual format of any given cached object is known only by encode service manager 22 and its associated encode service providers 24. Thus, for data integrity and compression efficiency purposes, all accesses to server-side cache memory 30 in this configuration are done through encode manager 22.

To illustrate the general operation of remote scaling server 34, assume a user of network client 12 wishes to access a particular Web page, or URL (Uniform Resource Locator), on Internet 18. Further assume that the desired URL is accessible through remote scaling server 34. Network client 12, via browser 32, transmits an HTTP request for the desired Hypertext object to remote scaling server 34 over client/server communications link 14. Where browser 32 normally accesses Internet 18 through a proxy, browser 32 may be configured to pass user requests through remote scaling server 34 via its standard proxy configuration procedures. Browser 32 may actually transmit a plurality of HTTP requests corresponding to each of various distinct Hypertext objects that may be embedded in the Web page. Remote scaling server 34 processes each such request in the manner described below.

In the configuration of FIG. 3, HTTP remote proxy 36 is capable of distinguishing between a non-enabled network client and an enabled network client. This may be accomplished, for example, by using a private protocol to transmit content requests from an enabled network client to remote scaling server 34, so that the use of some other communication protocol indicates the network client is non-enabled. This method of sending a special protocol in each request to HTTP remote proxy 36 represents an improvement over known registration-type processes. The overhead involved in making the enabled/non-enabled determination on a per-request basis is relatively small, while providing a significant advantage because it addresses the situation for HTTP remote proxy 36 where a first network client disconnects and a second network client, likely with different communications and/or presentation capabilities, reconnects using the same IP address.

Upon determining that network client 12 is non-enabled, HTTP remote proxy 36 may record the IP address of network client 12 in a client preference table 26 maintained in a local data store (client preference table 26 may improve the performance of this or other configurations, but is not required). HTTP remote proxy 36 may then determine a default setting for whether or not to scale the content to be returned to network client 12 based, for example, on the (known or derived) link speed of client/server communications link 14. HTTP remote proxy 36 records the result of this determination in client preference table 26. HTTP remote proxy 36 may also update client preference table 26 on an ongoing basis to adapt to changing conditions, such as congestion on client/server communications link 14.

HTTP remote proxy 36 then passes an identifier for the requested Hypertext object to encode manager 22 along with an indication of whether to send network client 12 an original or scaled version. Upon being invoked, encode manager 22 first calls server-side cache interface 28 with the identifier for the requested Hypertext object to determine whether a copy of the required version already resides in server-side cache memory 30. For purposes of illustration, assume no such entry exists. HTTP remote proxy 36 then invokes a call to retrieve the Hypertext object from Internet 18 over server/network communications link 16. Assuming the Hypertext object is found, HTTP remote proxy 36 begins receiving an HTTP data stream representing the Hypertext object. HTTP remote proxy 36 passes the handle for this incoming data stream to encode manager 22.

Encode manager 22 may initiate creation of a scaled version of a received Hypertext object regardless of whether the particular network client 12 which requested the Hypertext object is to receive an original or a scaled version. Where network client 12 is to receive an original version, the block of data is first received from Internet 18 and passed unmodified to network client 12 in a streaming fashion. Compression of this block of data may then be done in background. Nevertheless, it is desirable to have a scaled version of the Hypertext object available in server-side cache memory 30 to facilitate subsequent requests by the same network client 12 or a request by different network clients 12. Alternatively, encode service provider 24 may create a scaled version of the requested object based upon satisfaction of some predetermined selection criterion.

Non-enabled network client 12 may optionally be provided with the ability to actively control the trade-off between download time and content quality by selecting whether or not to scale content and/or control the extent of such scaling. To provide this ability, HTTP remote proxy 36 may embed additional instructions at the beginning of the HTML header for the requested URL prior to transmitting the associated data stream to network client 12. These embedded instructions may be implemented, for example, as a dynamic executable module using JavaScript codes, VB Script codes or Java Applet codes. As browser 32 of network client 12 receives the data stream, the embedded instructions will automatically execute so long as browser 32 is equipped to support them. For example, if the embedded instructions are implemented as JavaScript codes, browser 32 may be a JavaScript-enabled browser such as a Netscape Navigator v.2.0 or above browser, or an Internet Explorer v.3.0 or above browser. If browser 32 is not equipped for such HTML scripting, the embedded instructions will not interfere with the browser's 32 normal processing, as such browsers 32 are typically configured to ignore any data they cannot interpret.

Figure 4:
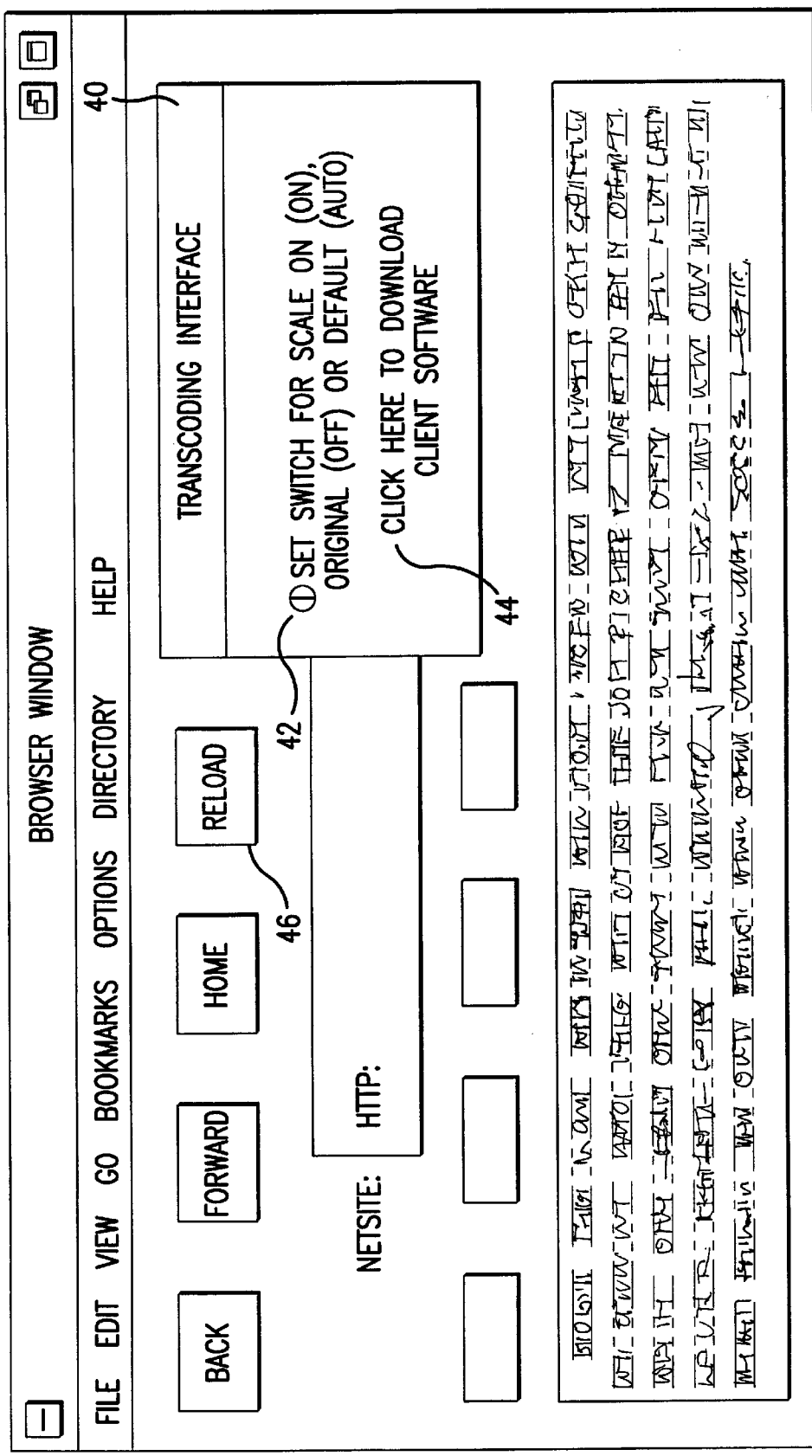
FIG. 4 is a schematic diagram illustrating an example of a user interface which may be used in connection with embodiments of the present invention.

The embedded instructions transmitted to network client 12 can enable the user to influence the transcode functionality of remote scaling server 34. As illustrated in FIG. 4, the embedded instructions drive a user interface in the form of a pop-up window 40 that is displayed at the top of a browser window 38. Pop-up window 40 includes a three-state switch 42 having "ON," "OFF" and "AUTO" settings, and may also include a Hypertext link 44 which the user may follow to download specialized decoding client software supporting more sophisticated transcoding functionality (that is, become "enabled"). The initial setting of three-state switch 42 may be based upon a prior determination by HTTP remote proxy 36 as to whether network client 12 has an established preference for reception of scaled content. If so, three-state switch 42 may be initially set to "ON;" if not, three-state switch 42 may be set to "OFF." A goal of this feature is to provide the user with some means for communicating a preference to HTTP remote proxy 36 with regard to the content quality/latency tradeoff. Persons skilled in the art will recognize that many other means for providing this capability are possible, and such other means could enable the user to communicate information beyond simply transcoding preferences.

In the configuration of FIG. 4, pop-up window 40 enables the user to change his or her preference as to whether scaled or original content is desired, and communicates such changes to HTTP remote proxy 36. Pop-up window 40 may or may not interact with browser 32, meaning the user's preference will only take effect after setting three-state switch 42 and clicking on the browser's 32 "RELOAD" button 46 to cause browser 32 to request the (scaled or unscaled) content for presentation to the user. Subsequent pages in the current session may then be rendered in accordance with the new setting of three-state switch 42 without further user intervention. Upon receipt, HTTP remote proxy 36 may update user preference table 26 accordingly. As an alternative, pop-up window 40 may be configured to automatically invoke the "RELOAD" operation when the user indicates a change (such as by flipping three-state switch 42). Where browser 32 is a JavaScript-enabled browser, JavaScript instructions inserted by HTTP remote proxy 36 in the HTML document may "POST" the state of three-state switch 42 to HTTP remote proxy 36 and also cause browser 32 to "RELOAD" the current URL.

It is possible to allow a non-enabled network client 12 to save the state of three-state switch 42 on network client 12 across multiple sessions of browser 32 using what is known in the art as a "cookie." In other words, a cookie may be used to store the state of three-state switch 42 persistently. When a new session of browser 32 is initiated by a user, this state information may be read from network client 12 and "POSTed" by the JavaScript code (inserted at the beginning of the HTML document) to HTTP remote proxy 36 before any content for the requested Hypertext object is actually sent to network client 12. This will allow HTTP remote proxy 36 to update user preference table 26 with the correct state of three-state switch 42, and hence send correctly-scaled content to network client 12. In such a configuration of network client 12, the state information may be "POSTed" to HTTP remote proxy 36 each time a given URL is requested by browser 32. This will allow network client 12 to receive the correctly-scaled content even if HTTP remote proxy 36 to which it is coupled changes due to, for example, a change in geographical location of network client 12 or network load-balancing procedures.

The configuration illustrated in FIG. 3 may be used for network clients 12 that already access Internet 18 through a standard network proxy. JavaScript-enabled browsers 32 may query the local IP address of network client 12 and "POST" this information to HTTP remote proxy 36. The HTTP header of this "POST" message will contain the IP address of the standard proxy, which will now be different from the IP address of network client 12 (which is included in the contents of the message). A comparison of the two IP addresses will indicate that network client 12 resides behind a standard proxy. HTTP remote proxy may then use this information to update scaling information about network client 12 in user preference table 26.

The description of the configuration illustrated in FIG. 3 provides a context for application of embodiments of the present invention, presenting one type of performance-improving device to which such embodiments may be applied. It should be noted, however, that the present invention is not limited in this regard. Persons skilled in the art will recognize from the following description that embodiments of the performance-improvement data collection and display facilities discussed herein may readily be used with a variety of performance-improving devices.

Referring again to the embodiment illustrated in FIG. 2, performance data collection module (PDC) 60 may be implemented, for example, as a software routine within HTTP remote proxy 36 or encode manager 22, as an encode service provider 24, or as a separate executable module coupled to or otherwise capable of exchanging information with HTTP remote proxy 36. Performance data collection module 60 and performance data display module 62 work together to quantify and display performance improvement information. One way in which this may be accomplished is for remote scaling server 34 to transmit performance-related information to network client 12 each time it downloads a requested data object (for example, any URL-addressable Web content). In one particular implementation, this performance-related information may include the original size of the data object (that is, before compression or other transcoding) and the size of the data object actually being downloaded (that is, after compression or other transcoding). In addition, remote scaling server 34 may provide an indication of whether the requested data object was retrieved from cache memory 30 or instead had to be retrieved from Internet 18. This indication of caching activity may comprise or include a caching benefit factor representing a quantification of the performance improvement attributable to caching. The caching benefit factor may be a pre-set percentage maintained by performance data collection module 60 (for example, any time a requested object is retrieved from cache memory 30 instead of from Internet 18, it is assumed that a 50% improvement in download performance is realized), or may be a percentage calculated by performance data collection module 60 based upon, for example, characteristics of the requested data object, characteristics of client/server communications link 14, and/or characteristics of server/network communications link 16.

Remote scaling server 34 includes performance improvement data in the data streams it transmits to network client 12 in response to requests for data objects. The performance improvement data may be embedded in the data stream using, for example, JavaScript codes, VB Script codes or Java Applet codes, in the same manner described above for providing a non-enabled network client 12 with the ability to communicate transcoding preferences. In one particular implementation, remote scaling server 34, using performance data collection module 60, may transmit performance improvement data to network client 12 as a tuple of predetermined format (for example, original size/compressed size/caching benefit factor) included in each download of requested content. Performance data display module 62 may be configured to maintain performance improvement information received from remote scaling server 34 using the same type of facilities described above for maintaining client preference information (for example, a cookie).

Each time performance data display module 62 receives such a tuple of performance improvement information from remote scaling server 34, it compares that tuple to a previously-stored tuple. Performance data display module 62 may then assume that any change in the tuple (or receipt of a tuple when no previously-stored tuple exists) indicates the beginning of a new download, causing performance data display module 62 to update (or initiate) a display of performance improvement information. Performance improvement information may be presented in the form of a pop-up window of the type described with reference to FIG. 4.

A requested data object, such as a particular Web page, will typically include a number of separately-addressable embedded data objects (for example, images). Some of these data objects may be transcoded by remote scaling server 34 prior to downloading to network client 12, while others may be downloaded in their original format; likewise, some of these data objects may be stored in cache memory 30, while others must be retrieved from Internet 18. In such a case, performance data collection module 60 may be configured to accumulate performance improvement information for all of the embedded data objects associated with a given Web page in order to provide network client 12 with page-level performance improvement information. The display may be presented on network client 12 for the duration of the download, updated in real-time as each embedded data object is downloaded, and may be removed when performance data display module 62 detects that the Web page is completely downloaded (for example, by receiving two consecutive identical tuples of performance improvement information from remote scaling server 34).

Figure 5:
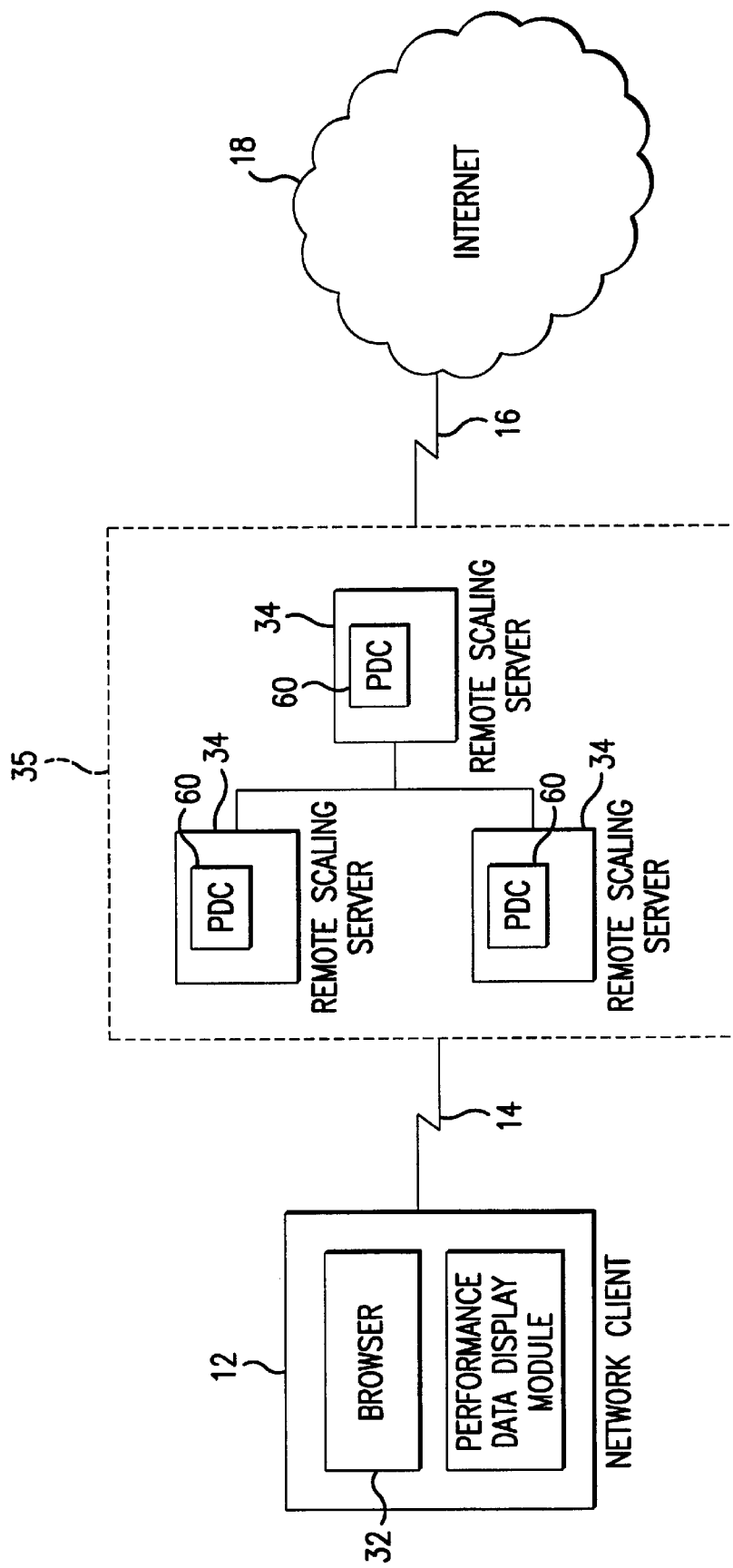
FIG. 5 is a schematic diagram illustrating an embodiment of the present invention wherein distributed performance improvement services are provided to a network client.

According to another embodiment of the present invention, illustrated in FIG. 5, accurate performance improvement information may be provided to network client 12 even where network client 12 is serviced by a plurality of related remote scaling servers 34. As is known in the art, network client 12 may be configured to direct requests for network content to a "proxy farm" 35 comprising a plurality of remote scaling servers 34. Proxy farm 35 represents a configuration which enables transcoding and/or caching services to be distributed across a plurality of devices in a non-uniform manner based, for example, on factors such as current network load or as the result of a DNS (Domain Name Service) round-robin algorithm. Each of the multiple remote scaling servers 34 are associated with the same domain name, thereby enabling the distributed processing to occur in a manner that is transparent to network client 12.

To facilitate the ability of each remote scaling server 34 in proxy farm 35 to provide cumulative performance improvement information to network client 12, remote scaling servers 34 may be configured to broadcast such information (for example, as a tuple such as that described above) to each of the other remote scaling servers 34 whenever it satisfies a request for a data object from network client 12. Such a broadcast may be accomplished using any of a variety of methods known in the art, including but not limited to IP broadcast, peer-to-peer unicast using new or already open TCP/UDP sockets, or peer-to-peer polling using new or already open TCP/UDP sockets. Since remote scaling servers 34 will typically service a plurality of network clients 12, such broadcasts will also include an identifier (for example, an IP address) for the particular network client 12 with which the broadcast performance improvement information is associated. Upon receiving such a broadcast, each remote scaling server 34 may store the received information in a data store along with any previously-received tuples for that network client 12. In addition, or alternatively, remote scaling server 34 may accumulate the received information with previously-received information in the manner of, for example, a running total of performance improvement associated with satisfaction of a present request from network client 12. In general, however, only one remote scaling server 34 in proxy farm 35 will interact with network client 12 at any given time, and thus only that one remote scaling server 34 needs to have cumulative performance improvement information on hand.

According to a variation of this embodiment, network client 12 may be configured to influence the rate at which remote scaling servers 34 provide updates of performance improvement information. This may be accomplished, for example, through a dynamic executable module downloaded to network client 12 in the manner described above. This may be, but need not be, the same dynamic executable module which controls the display of performance improvement information on network client 12. In accordance with this particular embodiment, the dynamic executable module includes code which causes network client 12 to periodically transmit a so-called "heartbeat" or "keepalive" message to proxy farm 35. Since only one remote scaling server 34 on proxy farm 35 will be servicing keepalive messages from network client 12 at any given time, only that active remote scaling server 34 will receive the keepalive message from network client 12. In response to receipt of the keepalive message, remote scaling server 34 accumulates the values from all of the previously-stored tuples of performance improvement information associated with that particular network client 12 and transmits the cumulative information to network client 12 for display.

The dynamic executable module provided to network client 12 for generating the keepalive message may be configured to increase the frequency at which the keepalive message is transmitted during a download of requested content from proxy farm 35, thereby enabling realtime updating of the displayed information. For example, if network client 12 normally transmits a keepalive message at a frequency of one every "x" seconds, it may be configured to transmit such a message every "y" seconds (where y<x) for the duration of a download. Performance studies have indicated that suitable values for "x" and "y" are 10 seconds and 5 seconds, respectively, based on an average per-page download time of 18 seconds. In general, if "z" is the time that it takes for an average page to download, then y<x<z. The smaller the value to which "y" is set, the smoother will be the continuous, realtime display of performance improvement information on network client 12. To avoid unnecessarily expending remote scaling server 34 resources, network client 12 may be configured to revert to transmitting its keepalive message at a frequency of "x" upon completion of a given download.

According to another variation of this embodiment, if the dynamic executable module on network client 12 is able to detect when browser 32 generates a request to proxy farm 35, there is no need to compare a current tuple of performance improvement information (that is, transmitted by remote scaling server 34 in response to a keepalive message from network client 12) to a previously-received tuple to determine whether to display performance benefit information to the user. The dynamic executable module may simply assume that the next tuple received corresponds to the latest request transmitted to proxy farm 35. A benefit of this particular embodiment is that there is no need for network client 12 to maintain two different frequencies for transmitting keepalive messages.

Figure 6:
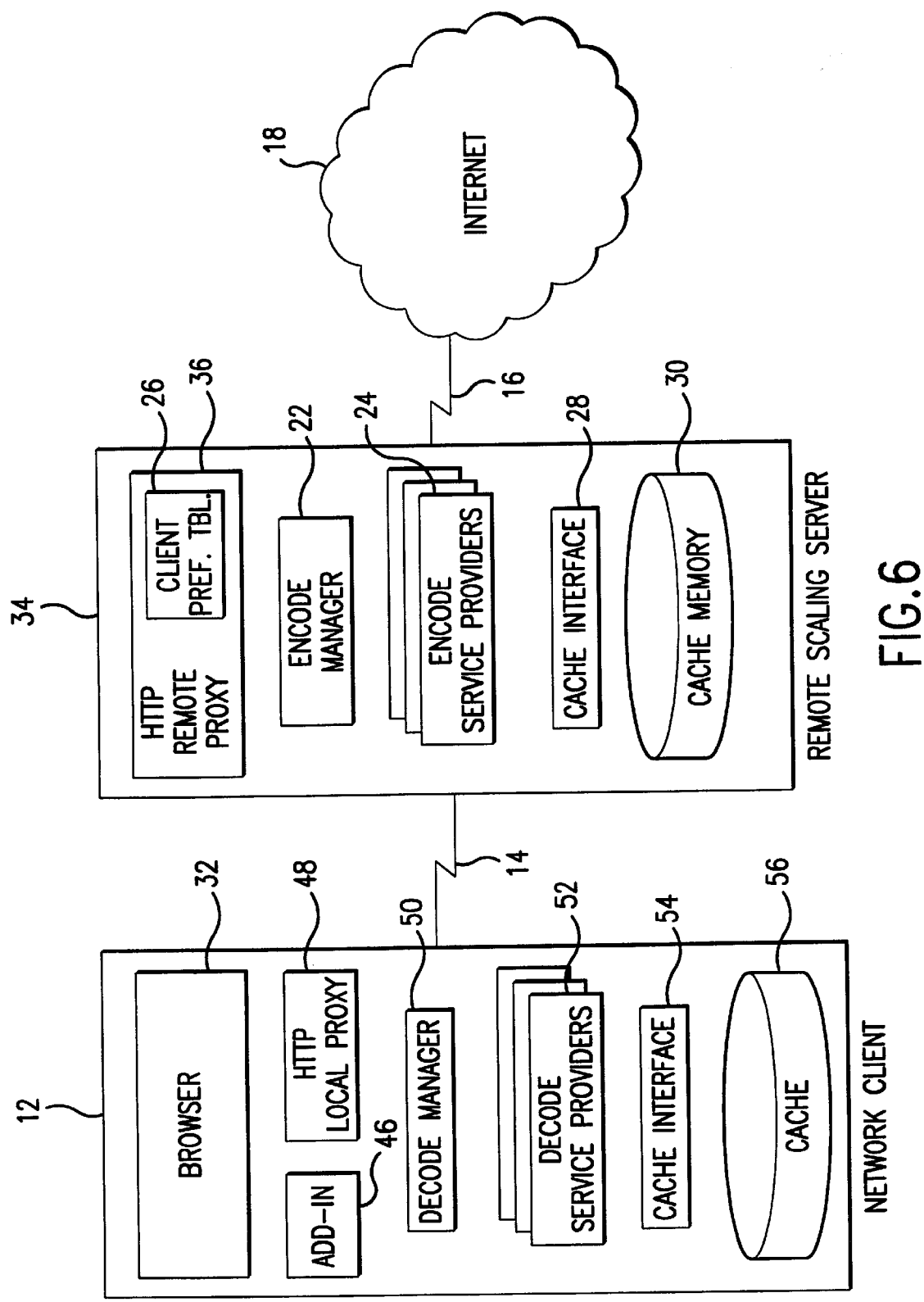
FIG. 6 is a schematic diagram illustrating an enabled network client of a type to which embodiments of the present invention may be applied.

Embodiments of the present invention may also be applied where network client 12 is "enabled," containing specialized decoding software to support more sophisticated scaling features than may be provided in the above-described "non-enabled" client configurations. With reference to FIG. 6, network client 12 includes an HTTP local proxy 48 coupled to a decode manager 50 which, similar to encode manager 22 of remote scaling server 34, controls one or more decode service providers 52. Each decode service provider 52 is responsible for decompression and/or translation of one or more different types of data content, and serves as a counterpart to an encode service provider 24. As in remote scaling server 34, network client 12 may include a client-side cache memory 56 managed by a client-side cache interface 54. Here, client-side cache interface 54 may be an already-existing facility supported by the operating system, such as WININET. Using an existing caching facility reduces the amount of software that is to be downloaded to network client 12, and also allows other applications, such as disconnected browsers, to share client-side cache memory 56.

HTTP local proxy 48, decode manager 50 and decode service providers 52 (collectively, the client software) may be downloaded to network client 12 on demand, such as by clicking on Hypertext link 44 presented by pop-up window 38 illustrated in FIG. 4. Alternatively, the client software could be distributed to users on a portable storage medium, such as a diskette or CD-ROM, or it may be preloaded on an off-the-shelf personal computer. In the configuration of FIG. 6, the client software is separate from browser 32; however, it is also possible for the client software to be integrated in browser 32.

Enabled client configurations can provide network client 12 with expanded flexibility for rendering Hypertext objects. As in the non-enabled client configurations described above, enabled network client 12 may receive a scaled data stream from HTTP remote proxy 36 in a format that is already supported by the standard internal rendering software of browser 32 (e.g., JPG, GIF). In addition, HTTP remote proxy 36 may scale a Hypertext object to a data stream having a new MIME type capable of being translated by decode service provider 52 to a MIME type supported by browser 32. For example, HTTP remote proxy 36 could transmit a file compressed using a non-standard, not well-supported but leading edge compression algorithm to network client 12, and decode service provider 52 could uncompress the file back to its original format. This approach has the benefit of relieving HTTP local proxy 48 from having to provide a user interface, and eliminates restrictions imposed by limitations as to the data types supported by browser 32. In this way, the compression/decompression process can remain transparent to users, browsers and Web servers.

Yet another possibility is that enabled network client 12 includes one or more add-ins 46 specifically configured to render or playback particular new MIME types generated by remote scaling server 34. Add-ins 46 may be implemented, for example, using Netscape plug-ins or ActiveX controls. Moreover, add-ins 46 may be installed as part of the client software, as illustrated in FIG. 6, or integrated with browser 32. Such add-ins 46 are beneficial in that they generally may be configured to permit a user to click on a specific object to obtain a different quality representation. Add-ins 46 are also beneficial in that they appear to a user to be well-integrated with browser 32, and are easily upgradeable. Combinations of the above-described presentation facilities are also possible.

In the configuration of FIG. 6, browser 32 sends all HTTP requests through HTTP local proxy 48, thus allowing HTTP local proxy 48 to improve retrieval and rendering of requested Hypertext objects. For example, when HTTP local proxy 48 receives an HTTP request from browser 32 for a Hypertext object associated with a given Web page, it passes the URL to client-side cache interface 54 to check whether a copy of the Hypertext object already exists in client-side cache memory 56. If the Hypertext object is cached, HTTP local proxy 48 passes the cached object to browser 32 for rendering. If the requested Hypertext object is not cached, HTTP local proxy 48 transmits an HTTP request to remote scaling server 34 for processing. HTTP local proxy 48 may use a custom Get( ) request for this purpose to enable remote scaling server 34 to identify network client 12 as enabled. Performing the processing described above with reference to other embodiments, remote scaling server 34 will return a data stream for the Hypertext object to HTTP local proxy 48.

According to an embodiment of the present invention directed to an enabled network client 12, accumulation of performance improvement information is somewhat simpler than in the above-described non-enabled client embodiments. Here, there would be no need for synchronization of the various remote scaling servers 34 in proxy farm 35. Rather, each remote scaling server 34 need only include performance improvement information (for example, the tuple described above) with each object it downloads to network client 12. Software resident on network client 12, such as HTTP local proxy 48, decode manager 50 and/or add-in 46 is then responsible for accumulating such information for the various embedded data objects associated with, for example, a requested Web page.

Figure 7:
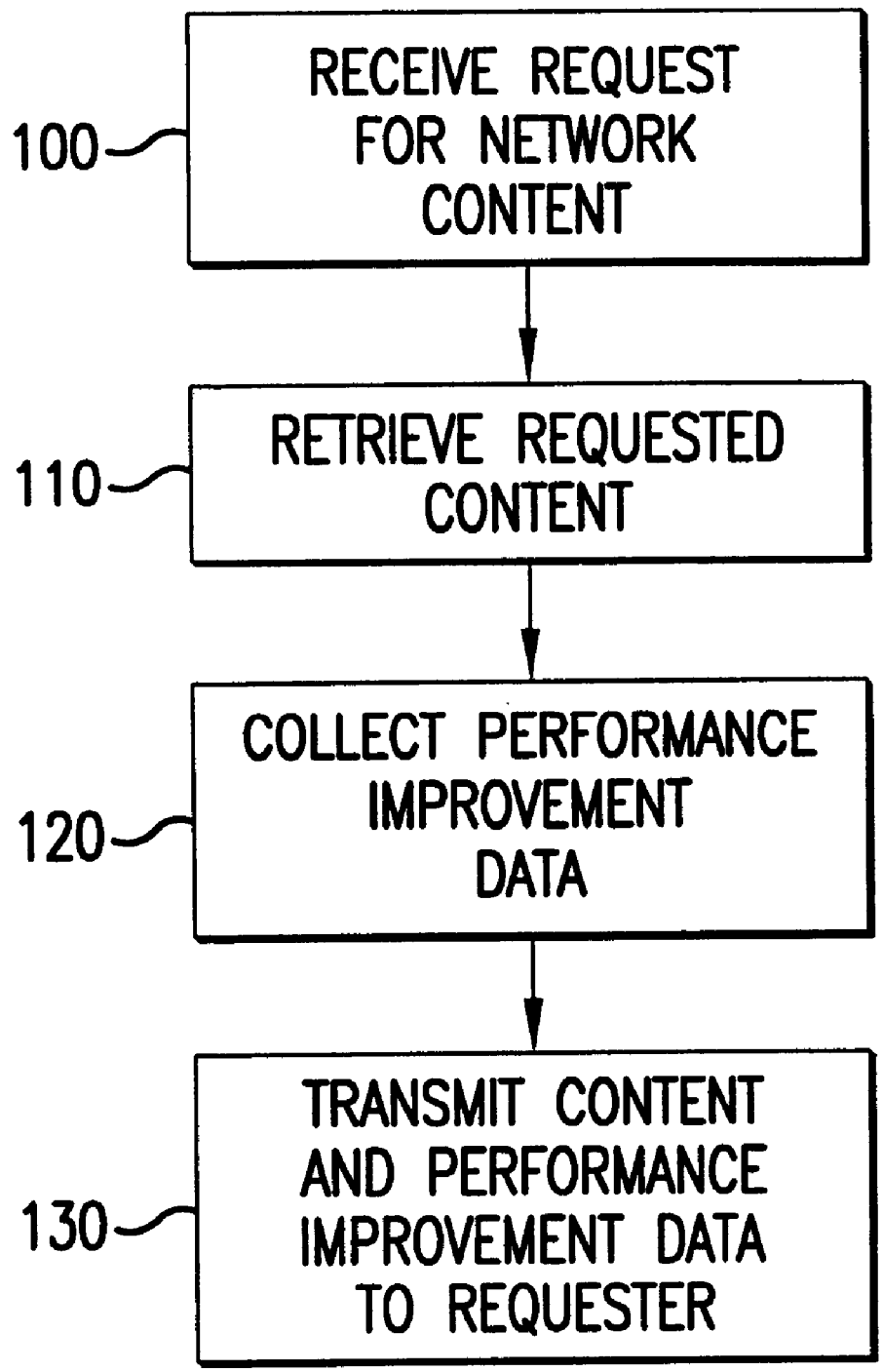
FIG. 7 is a flow chart illustrating a method for collecting and displaying performance improvement information according to an embodiment of the present invention.

By way of further illustration, FIG. 7 illustrates in flow chart form a general method for collecting and displaying performance improvement information in accordance with an embodiment of the present invention. The described method may be performed, for example, by a remote scaling server such as that illustrated in FIG. 2. Processing begins upon receipt of a request for network content (Step 100). The requested content is then retrieved (Step 110), either from a content server or from a cache. The content may or may not be transcoded, depending upon considerations such as those described above with reference to FIG. 3. Performance improvement information is then collected relating, for example, to services performed in connection with providing the requested network, such as transcoding and/or caching (Step 120). Finally, the requested content is transmitted to the client device along with the performance improvement information (Step 130).

The foregoing is a detailed description of particular embodiments of the present invention. The invention embraces all alternatives, modifications and variations that fall within the letter and spirit of the claims, as well as all equivalents of the claimed subject matter. For example, some or all of the features described above as being provided by a remote scaling server or network proxy may instead be implemented in a content server. Likewise, some or all of the features described above as being provided by an HTTP local proxy may be implemented in a browser application. Moreover, although the present invention has been described with reference to improving interactions between a network client and the Internet, embodiments are equally applicable to other networking environments (for example, an intranet). Persons skilled in the art will recognize from the foregoing detailed description that many other alternatives, modifications and variations are possible.

What is claimed is:

1. A system for gathering and presenting performance improvement information corresponding to scaling services performed in connection with providing content from a computer network in response to a request from a client device, said system comprising:

a client device including a performance data display module; and a remote scaling server arranged between said client device and the computer network, said remote scaling server being configured to perform one or more scaling services and including a performance data collection module, wherein said performance data collection module interacts with said performance data display module to provide performance improvement information attributable to a scaling service performed by said remote scaling server in satisfying a request for content by said client device, the performance improvement information reflecting a difference in performance between satisfying the request by said client device using the scaling service and satisfying the request by said client device without using the scaling service.

2. The system of claim 1, further comprising a plurality of remote scaling servers coupled between said client device and the computer network, said plurality of remote scaling servers being arranged to provide distributed processing of requests from said client device.

3. The system of claim 2, wherein each of said remote scaling servers further includes instructions for communicating performance improvement information among said plurality of remote scaling servers.

4. The system of claim 3, wherein one of said remote scaling servers further includes instructions for collecting performance improvement information from another of said plurality of remote scaling servers.

5. The system of claim 4, wherein said one of said remote scaling servers further includes instructions for accumulating said collected performance improvement information.

6. The system of claim 5, wherein said one of said remote scaling servers further includes instructions for transmitting accumulated performance improvement information to said client device in response to a message from said client device.

7. The system of claim 1, wherein said performance data display module comprises a dynamic executable module transmitted to said client device by said remote scaling server.

8. The system of claim 1, wherein said performance data display module includes instructions for controlling a rate at which said remote scaling server provides performance improvement information to said client device.

9. The system of claim 1, wherein said scaling service performed by said remote scaling server comprises transcoding network content requested by said client device and transmitting the transcoded network content to the client device.

10. The system of claim 1, wherein said scaling service performed by said remote scaling server comprises caching network content and transmitting cached network content to the client device in response to a request for network content.

11. A method for providing performance improvement information to a client device configured to retrieve network content through a transcoding server, said method comprising the steps of:
receiving at the transcoding server a request from the client device for network content;
retrieving the requested network content;
selectively transcoding the requested network content; and
transmitting the requested network content to the client device with performance improvement information relating to a performance improvement associated with at least one of said retrieval or transcoding of the requested network content by the transcoding server, the performance improvement information reflecting a difference in performance between satisfying the request from the client device using a service provided by the transcoding server and satisfying the request from the client device without using said service.

12. The method of claim 11, wherein said retrieval step comprises retrieving a cached version of the requested network content, the performance improvement information including a measure of performance improvement attributable to caching of the network content.

13. The method of claim 12, wherein the performance improvement information includes an indication of a reduction in download time associated with retrieving a cached version of the network content.

14. The method of claim 1, wherein said transcoding comprises data compression, said performance improvement information including an indication of a size difference between the network content before and after being compressed.

15. The method of claim 11, wherein said transmitting step further comprises transmitting a dynamic executable module to the client device for rendering the performance improvement information.

16. A set of instructions residing on a storage medium for execution by a transcoding server arranged between a client device and a computer network, said set of instructions comprising instructions for:
receiving at the transcoding server a request from the client device for network content;
retrieving the requested network content; and
transmitting the requested network content to the client device with performance improvement information relating to a performance improvement associated with at least one of said retrieval or transcoding of the requested network content, the performance improvement information reflecting a difference in performance between satisfying the request from the client device using a service provided by the transcoding server and satisfying the request from the client device without using said service.

17. The set of instructions of claim 16, wherein the storage medium comprises a portable magnetic storage device.

18. The set of instructions of claim 16, wherein the storage medium comprises a memory installed in a computer.

19. A method for presenting performance improvement information on a client device configured to communicate with an external network through a transcoding server, said method comprising:
transmitting a request for network content resident on the external network to the transcoding server;
receiving requested network content and performance improvement information from the transcoding server, the performance improvement information relating to a service performed by the transcoding server in satisfying the request for network content and reflecting a difference in performance between satisfying the request using the service and satisfying the request without using the service; and
displaying the performance improvement information.

20. A storage medium including a set of instructions for execution by a client device configured to communicate with an external network through a transcoding server, wherein the set of instructions includes instructions for:
transmitting a request for network content resident on the external network to a network device the transcoding server;
receiving the requested network content and performance improvement information from the transcoding server, the performance improvement information relating to a service performed by the transcoding server in satisfying the request for network content and reflecting a difference in performance between satisfying the request using the service and satisfying the request without using the service; and
displaying the performance improvement information.

* * * * *